(12) United States Patent
Liao et al.

(10) Patent No.: US 10,036,492 B2
(45) Date of Patent: Jul. 31, 2018

(54) FLUID-TRANSFERRING EXPANDER

(71) Applicants: Ying-Chieh Liao, Taichung (TW);
Yu-Kuo Liao, Taichung (TW)

(72) Inventors: Ying-Chieh Liao, Taichung (TW);
Yu-Kuo Liao, Taichung (TW)

( * ) Notice: Subject to any disclaimer, the term of this patent is extended or adjusted under 35 U.S.C. 154(b) by 323 days.

(21) Appl. No.: 14/944,863

(22) Filed: Nov. 18, 2015

(65) Prior Publication Data

US 2017/0138515 A1    May 18, 2017

(51) Int. Cl.
*F16L 17/10* (2006.01)
*F04B 9/14* (2006.01)
*F16L 55/134* (2006.01)

(52) U.S. Cl.
CPC ............... *F16L 17/10* (2013.01); *F04B 9/14* (2013.01); *F16L 55/134* (2013.01)

(58) Field of Classification Search
CPC ..... F16L 55/1141; F16L 55/12; F16L 55/128; F16L 55/134
USPC ................................... 285/97, 109
See application file for complete search history.

(56) References Cited

U.S. PATENT DOCUMENTS

| | | | | |
|---|---|---|---|---|
| 1,221,733 A | * | 4/1917 | Henderson | F16L 55/134 138/90 |
| 2,299,116 A | * | 10/1942 | Bennett | F16L 55/134 138/90 |
| 2,888,712 A | * | 6/1959 | Kramer | B29D 23/18 285/97 |
| 3,190,679 A | * | 6/1965 | Lester | F16L 17/10 285/97 |
| 5,353,842 A | | 10/1994 | Lundman | |
| 5,901,752 A | | 5/1999 | Lundman | |
| 8,544,894 B1 | * | 10/2013 | Borba | F16L 17/10 285/97 |
| 2002/0083989 A1 | * | 7/2002 | Lundman | F16L 55/134 138/91 |
| 2004/0124589 A1 | * | 7/2004 | Onuki | F16L 55/134 277/605 |
| 2004/0144439 A1 | * | 7/2004 | Lundman | F16L 55/134 138/93 |
| 2008/0075538 A1 | * | 3/2008 | Crane | F16L 55/128 405/184.3 |
| 2013/0284297 A1 | * | 10/2013 | Hacikyan | F16L 55/134 138/93 |

FOREIGN PATENT DOCUMENTS

FR        2429957 A1 *  1/1980   ............. F16L 55/12

* cited by examiner

*Primary Examiner* — David Bochna
(74) *Attorney, Agent, or Firm* — Muncy, Geissler, Olds & Lowe, P.C.

(57) ABSTRACT

A fluid-transferring expander, wherein a tube is disposed through a bladder structure, an expansion space is formed between the tube and the bladder structure, the tube is continuously extrudedly formed, the tube is formed with a first passage connected with a first fluid source and a second passage connected with a second fluid source and outside therein, and the tube is further formed with a through hole communicating with the expansion space and the first passage.

13 Claims, 4 Drawing Sheets

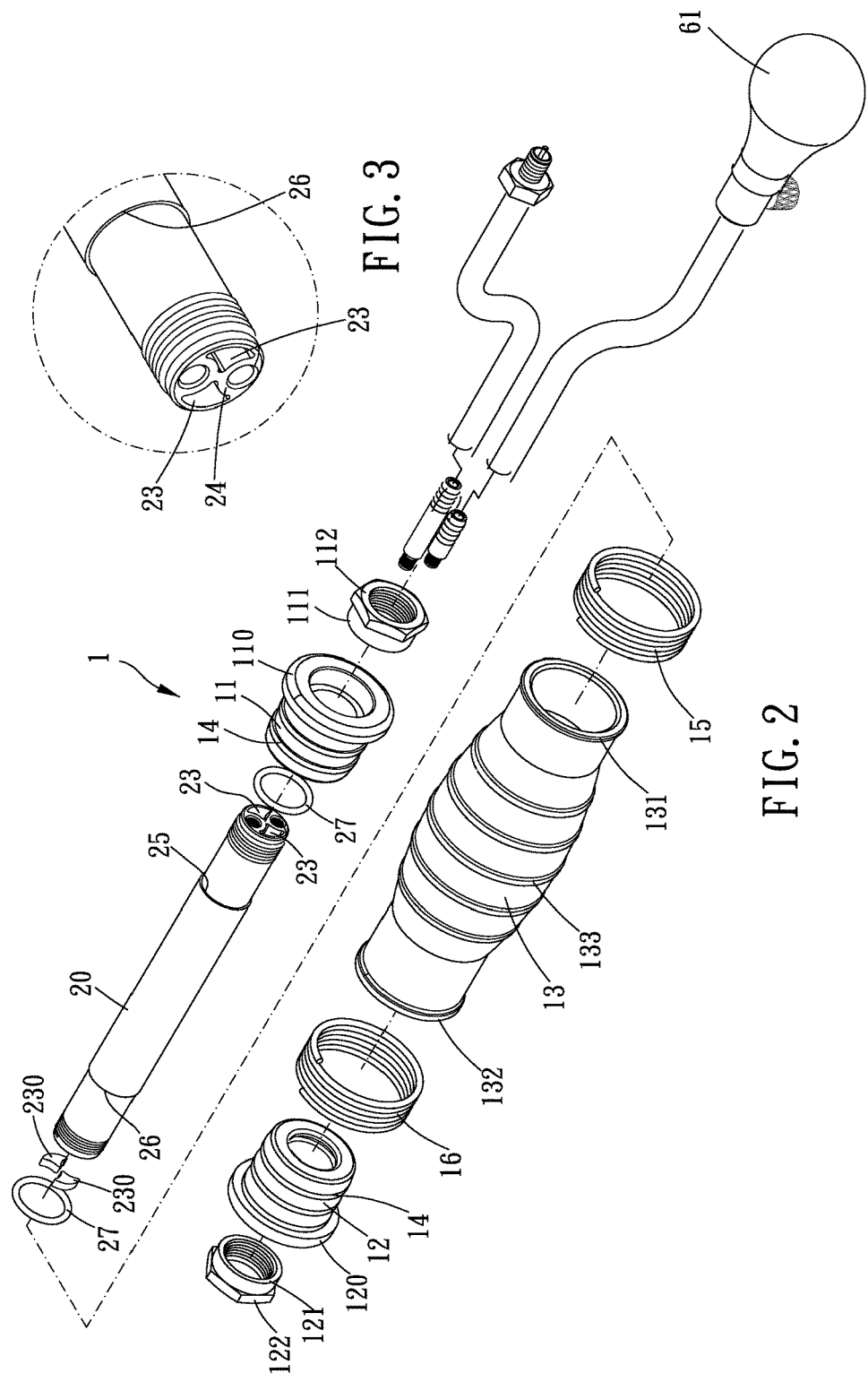

FLUID-TRANSFERRING EXPANDER

BACKGROUND OF THE INVENTION

Field of the Invention

The present invention relates to an expander.

Description of the Prior Art

In a conventional fluid-transferring expander, an interior of a tube is often formed with additional passages, or a solid tube is further formed with two channels, to connect different fluid sources and make different fluids flow to an expansion bladder or a fluid flow tube respectively. This type of fluid-transferring expanders are disclosed in U.S. Pat. Nos. 5,901,752 and 5,353,842.

However, it is complicated and time-consuming to process the tube of this type of fluid-transferring expander.

The present invention has arisen to mitigate and/or obviate the afore-described disadvantages.

SUMMARY OF THE INVENTION

The major object of the present invention is to provide a fluid-transferring expander, wherein a tube is extrudedly and integrally formed. In addition, a bladder portion may be restrained through a spiral spring to prevent two ends of the bladder portion from air leakage.

To achieve the above and other objects, a fluid-transferring expander is provided, wherein a tube is disposed through a bladder structure, an expansion space is formed between the tube and the bladder structure, the tube is continuously extrudedly formed, a first passage connected with a first fluid source and a second passage connected with a second fluid source and outside are formed in the tube, and the tube is further formed with a through hole communicating with the expansion space and the first passage.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a breakdown view of the present invention;

FIG. 3 is a perspective view of a tube of the present invention;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
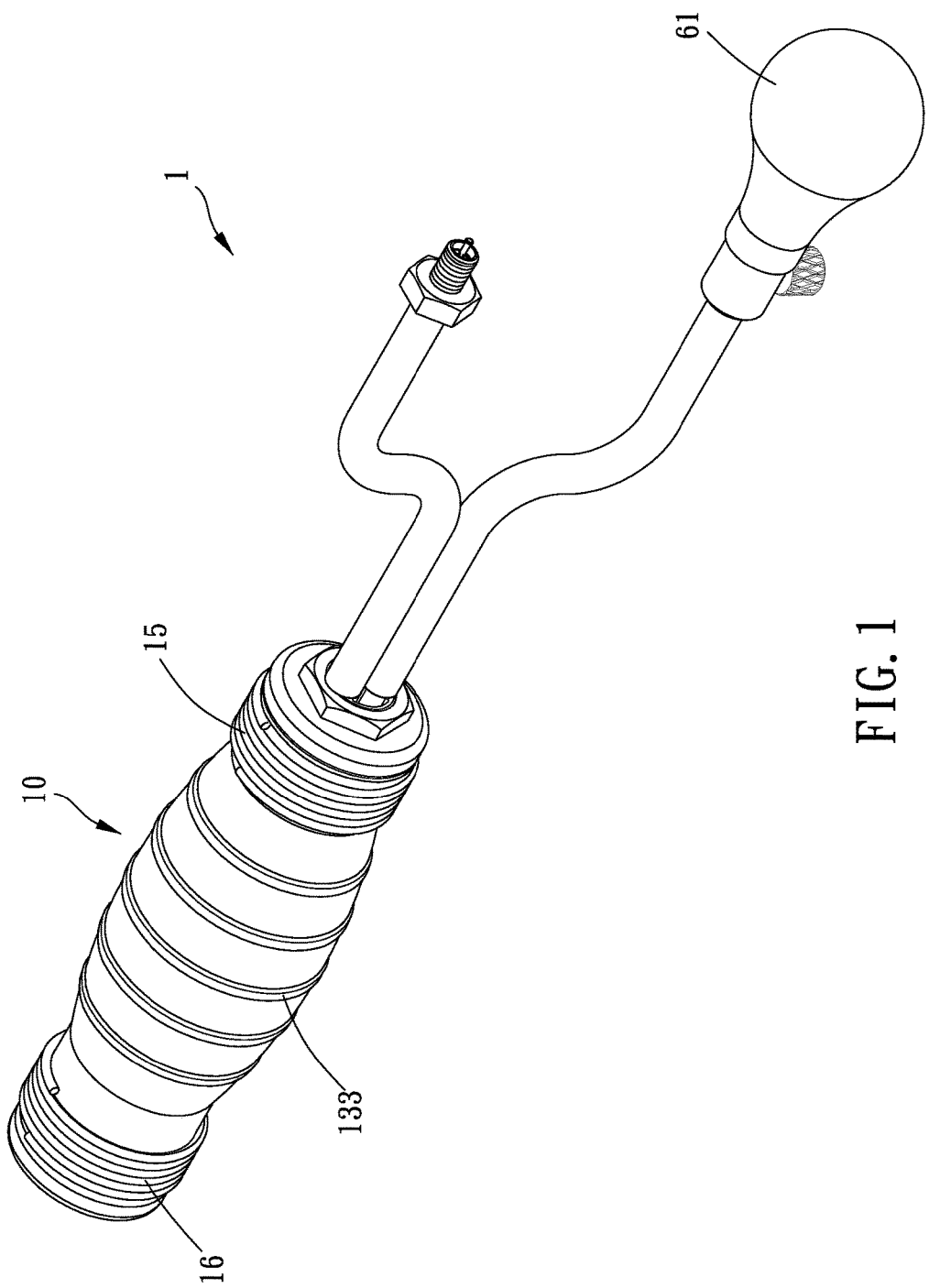
FIG. 1 is a perspective view of the present invention.
Figure 4:
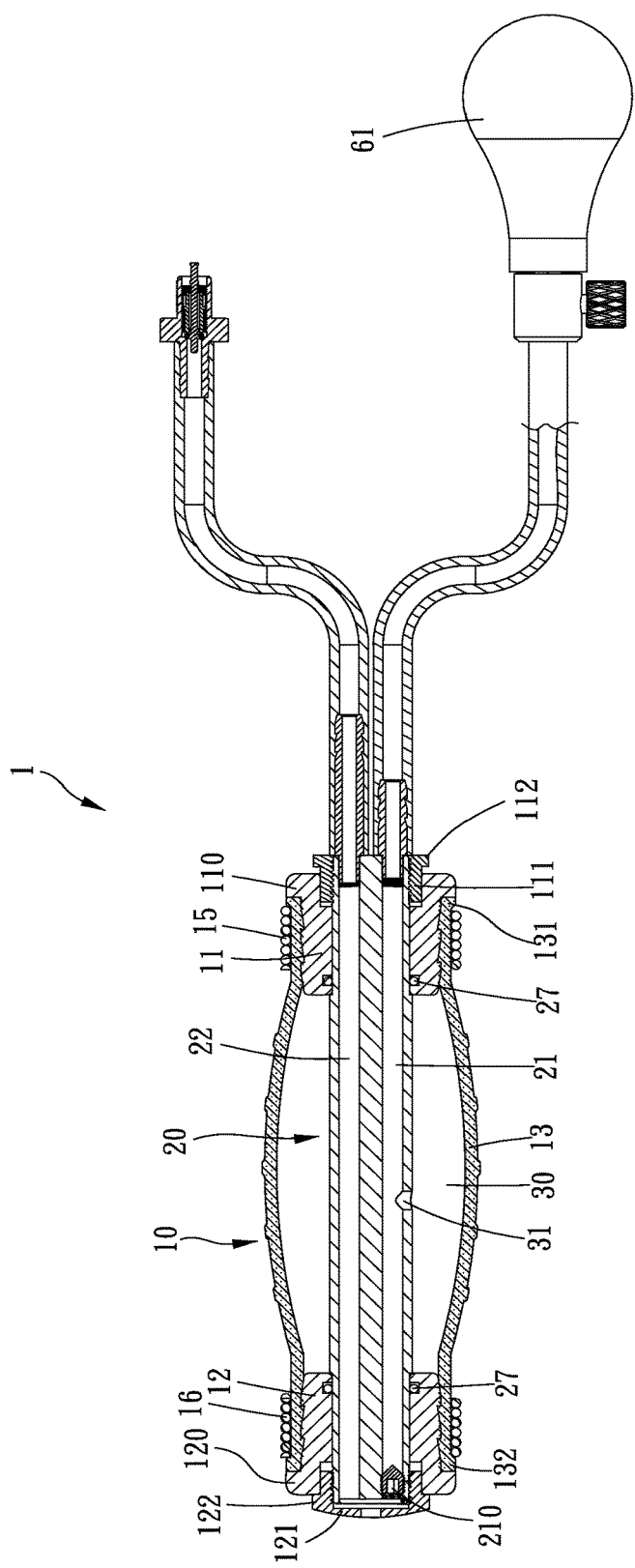
FIG. 4 is cross-sectional view of the present invention.
Figure 5:
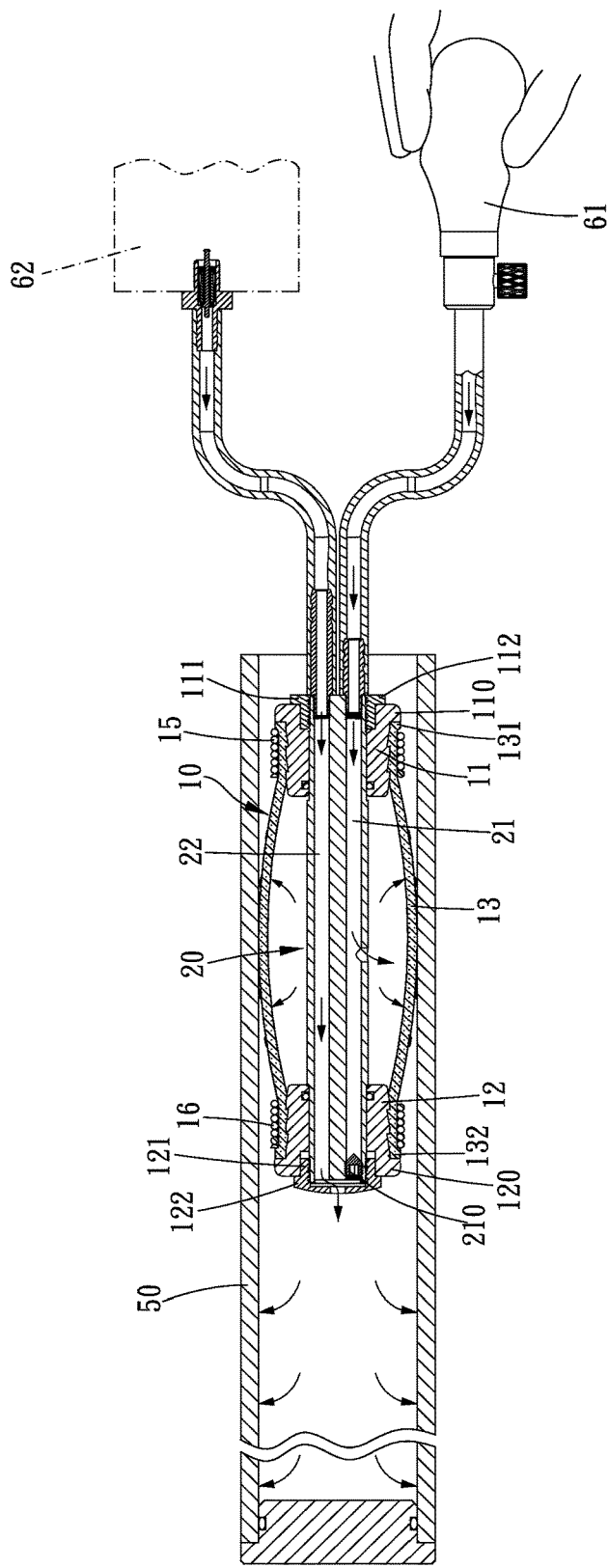
FIG. 5 is a cross-sectional view of the present invention in use.

Please refer to FIGS. 1 to 5, a fluid-transferring expander 1 is provided for transferring a fluid to a fluid flow tube 50, and the fluid-transferring expander 1 includes a bladder structure 10 and a tube 20.

The tube 20 is disposed through the bladder structure 10, and an expansion space 30 is formed between the tube 20 and the bladder structure 10. Specifically, the bladder structure 10 includes a bladder portion 13, a first sleeve portion 11 and a second sleeve portion 12. The first and second sleeve portions 11, 12 are disposed around the tube 20 and respectively at two ends of the bladder structure 10. The two ends of the bladder portion 13 are fixedly disposed around the first sleeve portion 11 and around the second sleeve portion 12 respectively. The expansion space 30 is formed between the bladder portion 13 and the tube 20. Of course, the bladder portion may be disposed around outside the tube instead of being disposed around the first and second sleeve portions.

The fluid-transferring expander 1 further includes a first fixing ring 111 inserted between the first sleeve portion 11 and the tube 20 and a second fixing ring 121 inserted between the second sleeve portion 12 and the tube 20. The bladder structure 10 is limitedly disposed between the first and second fixing rings 111, 121. Specifically, the first and second fixing rings 111, 121 are screwed with and around the tube 20 so that a user can assemble or disassemble the first and second fixing rings 111, 121 conveniently.

An exterior face of the tube 20 is radially formed with a first blocking face 25 facing the first sleeve portion 11 and a second blocking portion 26 facing the second sleeve portion 12, the first sleeve portion 11 is limitedly disposed between the first blocking face 25 and the first fixing ring 111, and the second sleeve portion 12 is limitedly disposed between the second blocking face 26 and the second fixing ring 121. Specifically, the first and second fixing rings 111, 121 extend radially to respectively form a first blocking flange 112 and a second blocking flange 122 which are substantially hexagonal, the first sleeve portion 11 is limitedly disposed between the first blocking face 25 and the first blocking flange 112, and the second sleeve portion 12 is limitedly disposed between the second blocking face 26 and the second blocking flange 122 so as to prevent the first and second sleeve members 11, 12 from dislocating from the tube 20. It is understandable that the first and second sleeve portions 11, 12 may be fixedly and limited disposed or movable back and forth within a range along the tube 20 in response to an expansion of the bladder portion 13.

Exterior surfaces of the first and second sleeve portions 11, 12 are respectively formed with a jagged portion 14 which is opposite to the expansion space 30 and radially abuts against the bladder portion 13 so as to enhance an engagement of the bladder portion 13.

An exterior surface of the bladder portion 13 is further surroundingly formed with at least one rib portion 133 (a number of the rib portion 133 may be one or more than one), and the at least one rib portion 133 is provided for radially abutting against an inner wall of the fluid flow tube 50 so as to improve sealing effect of the bladder portion 13 and the fluid flow tube 50.

Two O-rings 27 are sleeved on the tube 20, one said O-ring 27 radially abuts against the first sleeve portion 11 and the tube 20, and the other said O-ring 27 radially abuts against the second sleeve portion 12 and the tube 20 so as to prevent the fluid from flowing out from gaps between the first sleeve portion 11 and the tube 20 and between the second sleeve portion 12 and the tube 20.

The bladder structure 10 further includes a first spiral spring 15 and a second spiral spring 16 sleeved on the bladder portion 13, the bladder portion 13 is radially restrained between the first spiral spring 15 and the first sleeve portion 11, and the bladder portion 13 is radially restrained between the second spiral spring 16 and the second sleeve portion 12 to increase a fluid sealing effect of the bladder portion 13 on a radial direction. In addition, the first and second sleeve portions 11, 12 radially protrude to respectively form a first protrusive flange 110 and a second protrusive flange 120, the bladder portion 13 radially protrudes to form a third protrusive flange 131 and a fourth protrusive flange 132, the third protrusive flange 131 is sandwiched between the first protrusive flange 110 and the first spiral spring 15, and the fourth protrusive flange 132 is sandwiched between the second protrusive flange 120 and the second spiral spring 16. When the bladder portion 13 expands, the first and second spiral springs 15, 16 respectively force the third and fourth protrusive flanges 131, 132 to abut against the first and second protrusive flanges 110, 120 more tightly to increase the sealing and anti-off effects.

The tube 20 is continuously extrudedly formed, and a first passage 21 and a second passage 22 are formed in the tube 20. An end of the first passage 21 is for being connected with a first fluid source 61, an end of the second passage 22 is for being connected with a second fluid source 62, and the other end of the second passage 22 communicates with outside. The tube 20 is further formed with a through hole 31 communicating with the expansion space 30 and the first passage 21, the first passage 21 is provided with a blocking portion 210 therewithin, and the through hole 31 is formed between the blocking portion 210 and the first fluid source 61. Specifically, the tube 20 is extrudedly formed, so the first and second passages 21, 22 are straightly disposed through the tube 20. Compared with other manufacturing methods (additional tubular members are disposed through the tube, or the tube is drilled), it is easier and more quickly to manufacture the tube 20. Then, the blocking portion 210 is arranged in the first passage 21 to allow the fluid of the first fluid source 61 to flow to the expansion space 30 to expand the bladder structure 10 and prevent the fluid from flowing to the outside. In addition, the first and second fluid sources 61, 62 are disposed at a same end of the tube 20, and it is understandable that the first and second fluid sources may be disposed at two different ends of the tube.

To save material, the tube 20 is formed with at least one material-saving channel 23 which is disposed through the tube 20. A plugging block 230 is further sealingly plugged within each said material-saving channel 23 to prevent the fluid which flows to an interior of the fluid flow tube 50 through the second passage 22 from flowing back through the material-saving channel 23. Specifically, an interior of the second passage 22 communicates with the outside through the second fixing ring 121.

To allow the first and second passages 21, 22 to be in preferable spatial arrangement, the first and second passages 21, 22 are correspondingly arranged; therefore, a cross-section of an interior of the tube 20 has a connecting wall 24 which is substantially 8-shaped, an interior of the connecting wall 24 has the first and second passages 21, 22, the connecting wall 24 and an outer wall of the tube 20 has two said material-saving channels 23 therebetween, and a cross-section of the material-saving channel 23 is substantially sector-shaped. In addition, because the tube 20 is extrudedly formed, the connecting wall of the tube 20 has a substantially fixed thickness.

Give the above, the tube of the fluid-transferring expander is extrudedly and integrally formed, so it is easy and quick to manufacture the fluid-transferring expander. In addition, the bladder portion is restrained with, for example, the spiral spring to prevent the two ends of the bladder portion from air leakage.

While we have shown and described various embodiments in accordance with the present invention, it should be clear to those skilled in the art that further embodiments may be made without departing from the scope of the present invention.

What is claimed is:

1. A fluid-transferring expander, for transferring a fluid to a fluid flow tube, including:
    a bladder structure;
    a tube, disposed in the bladder structure, the tube and the bladder structure forming an expansion space, the tube being continuously extrudedly formed and formed with a first passage and a second passage therein, an end of the first passage for being connected with a first fluid source, an end of the second passage for being connected with a second fluid source, the other end of the second passage communicating with outside, the tube further formed with a through hole communicating with the expansion space and the first passage, the first passage further provided with a blocking portion therewithin, the through hole fanned between the blocking portion and the first fluid source;
    wherein the tube is further formed with at least one material-saving channel disposed through the tube, and a plugging block is further sealingly plugged within each said material-saving channel;
    wherein a cross-section of an interior of the tube has a connecting wall which is substantially 8-shaped, the connecting wall has the first and second passages therein, two said material-saving channels are formed between the connecting wall and an outer wall of the tube, a cross-section of the material-saving channel is substantially fan-shaped, and the connecting wall of the tube has a substantially fixed thickness.

2. A fluid-transferring expander, for transferring a fluid to a fluid flow tube, including:
    a bladder structure;
    a tube, disposed in the bladder structure, the tube and the bladder structure forming an expansion space, the tube being continuously extrudedly formed and formed with a first passage and a second passage therein, an end of the first passage for being connected with a first fluid source, an end of the second passage for being connected with a second fluid source, the other end of the second passage communicating with outside, the tube further formed with a through hole communicating with the expansion space and the first passage, the first passage further provided with a blocking portion therewithin, the through hole formed between the blocking portion and the first fluid source;
    wherein the bladder structure includes:
        a first sleeve portion, disposed at an end of the bladder structure and around the tube;
        a second sleeve portion, disposed at the other end of the bladder structure and around the tube;
        a bladder portion, the two ends thereof being fixedly disposed around the first sleeve portion and around the second sleeve portion respectively, the bladder portion and the tube forming the expansion space therebetween.

3. The fluid-transferring expander of claim 2, wherein the tube is further formed with at least one material-saving channel which is disposed through the tube, and a plugging block is further sealingly plugged within each said material-saving channel.

4. The fluid-transferring expander of claim 3, wherein a cross-section of a interior of the tube has a connecting wall which is substantially 8-shaped, the connecting wall has the first and second passages therein, two said material-saving channels are formed between the connecting wall and an outer wall of the tube, a cross-section of the material-saving channel is substantially fan-shaped, and the connecting wall of the tube has a substantially fixed thickness.

5. The fluid-transferring expander of claim 2, further including a first fixing ring inserted between the first sleeve portion and the tube and a second fixing ring inserted between the second sleeve portion and the tube, an interior of the second passage communicating with the outside through the second fixing ring, the bladder structure being limitedly disposed between the first fixing ring and the second fixing ring.

6. The fluid-transferring expander of claim 5, wherein the first and second fixing rings are screwed with and around the tube.

7. The fluid-transferring expander of claim 5, wherein an exterior face of the tube is radially formed with a first blocking face facing the first sleeve portion and a second blocking face facing the second sleeve portion, the first sleeve portion is limitedly disposed between the first blocking face and the first fixing ring, and the second sleeve portion is limitedly disposed between the second blocking face and the second fixing ring.

8. The fluid-transferring expander of claim 7, wherein the first and second fixing rings radially extend to respectively form a first blocking flange and a second blocking flange, the first sleeve portion is limitedly disposed between the first blocking face and the first blocking flange, and the second sleeve portion is limitedly disposed between the second blocking face and the second blocking flange.

9. The fluid-transferring expander of claim 2, wherein exterior surfaces of the first and second sleeve portions are respectively formed with a jagged portion which is opposite to the expansion space and radially abuts against the bladder portion.

10. The fluid-transferring expander of claim 2, wherein an exterior surface of the bladder portion is further surroundingly formed with at least one rib portion, and the at least one rib portion is for radially abutting against an inner wall of the fluid flow tube.

11. The fluid-transferring expander of claim 2, wherein two O-rings are sleeved on the tube, one said O-ring radially abuts against the first sleeve portion and the tube, and the other said O-ring radially abuts against the second sleeve portion and the tube.

12. The fluid-transferring expander of claim 2, wherein the bladder structure further includes a first spiral spring and a second spiral spring sleeved on the bladder portion, the bladder portion is radially restrained between the first spiral spring and the first sleeve portion, and the bladder portion is radially restrained between the second spiral spring and the second sleeve portion.

13. The fluid-transferring expander of claim 12, wherein the first and second sleeve portions protrude radially to respectively form a first protrusive flange and a second protrusive flange, the two ends of the bladder portion protrude radially to respectively form a third protrusive flange and a fourth protrusive flange, the third protrusive flange is sandwiched between the first protrusive flange and the first spiral spring, and the fourth protrusive flange is sandwiched between the second protrusive flange and the second spiral spring.

* * * * *